APPLICATION OF TRIANGULAR WAVEFORMS TO EXPONENTIAL IMPEDANCE MEANS TO PRODUCE SINUSOIDAL WAVEFORMS

Filed Jan. 21, 1965 2 Sheets-Sheet 1

INVENTOR
WILLIAM G. CROUSE

BY John C Black
ATTORNEY

United States Patent Office 3,350,575

Patented Oct. 31, 1967

3,350,575

APPLICATION OF TRIANGULAR WAVEFORMS TO EXPONENTIAL IMPEDANCE MEANS TO PRODUCE SINUSOIDAL WAVEFORMS

William G. Crouse, Endwell, N.Y., assignor to International Business Machines Corporation, New York, N.Y., a corporation of New York Filed Jan. 21, 1965, Ser. No. 426,847
23 Claims. (Cl. 307—88.5)

This invention relates to improvements in apparatus of the type which produce sine wave output signals and to a circuit arrangement with a sinusoidal which is capable of being changed rapidly and accurately between two or more frequencies while maintaining a constant amplitude. A triangular electrical signal of suitable peak-to-peak value is fed to a pair of oppositely poled diodes (connected in series or parallel) to produce a substantially sinusoidal output signal without the aid of reactive components.

In communications equipment of the frequency shift keying type, there is a need for an oscillator with a constant amplitude, sinusoidal output which can be changed between two or more frequencies. This change in frequency must be as rapid and as perfect as possible to maintain distortion of the data transmitted to a minimum.

Known sinusoidal oscillators which can meet these stringent requirements are elaborate and expensive.

Astable multivibrators which have a square wave output are capable of being changed in frequency with a high degree of perfection but the square wave output has a high harmonic content. Most of these harmonics can be filtered out if the frequencies of oscillation are sufficiently close to each other. When the frequencies are relatively far apart, for example, by a ratio in the order of 2:1, filtering presents a difficult problem. The filter must pass, without attenuation, the high frequency, yet reject the third harmonic of the lower frequency. A conventional lowpass filter is inadequate for this purpose and special notches are required to reject the third harmonic and, in some instances, higher harmonics.

When two frequencies have a ratio of 3:1, filtering becomes extremely difficult since the third harmonic of the lower frequency equals the fundamental frequency of the higher frequency. Filtering will result in time delays and phase distortion in the fundamental frequency, which in turn results in distortion of the transmitted data.

Sawtooth oscillators can be designed with the ability to change frequencies as precisely as the astable multivibrator, but filtering problems occur as in the case of the multivibrator.

Accordingly, it is a primary object of the present invention to provide improved apparatus for providing constant amplitude sinusoidal signals at either of at least two frequencies.

It is another object of the present invention to provide an oscillator means capable of operating at at least two frequencies and producing output signals, the amplitude of which is a linear function of time, together with an improved filter responsive to the output signals for producing essentially sinusoidal output signals.

It is another object of the present invention to provide an improved filter which is essentially independent of the frequency of the signal being filtered.

The objects set forth above are achieved in the preferred embodiment by taking advantage of the forward voltage-current characteristic of solid state diode devices, which characteristic is exponential and closely resembles 90° of a sinusoidal waveform. When the voltage or current drive into a pair of oppositely poled diodes is varied linearly as a function of time between upper and lower peaks (sometimes referred to hereinafter as "triangular" signals), an output is obtained, the amplitude of which resembles a sine wave.

In one embodiment, a pair of oppositely poled diodes is connected to opposite plates of a low impedance capacitor in series-circuit relation. Both diodes are forward biased by constant current sources, preferably near the beginning of the so-called low impedance region. A triangular input voltage signal is applied to one end of the series circuit, and a sine wave current output appears at the other end of the circuit. The triangular waveform is centered about ground potential, the positive and negative slopes are approximately equal, and the peak-to-peak swing approximates twice the potential across each diode when its predetermined bias current exists. As a result, a swing in the input of one polarity causes the current in one diode to vary from its bias level to about twice the bias level and back to the bias level; and the swing of opposite polarity causes the current in the one diode to vary toward zero and back to the bias level. The change in current in the other diode is 180° out of phase with that in the one diode. Each of these swings produces a change in the output current which resembles 180° of a sine wave. The output of the diode filter is connected to the input of a low impedance, linear transistor amplifier to produce a generally sinusoidal output voltage; and, a series-connected resistance of selected value is interposed between the source of input voltage and the diodes to cause the output current and voltage to more closely resemble a sine wave.

It is therefore another object of the present invention to provide an improved diode filter.

The foregoing and other objects, features and advantages of the invention will be apparent from the following more particular description of preferred embodiments of the invention, as illustrated in the accompanying drawings.

Figure 1:
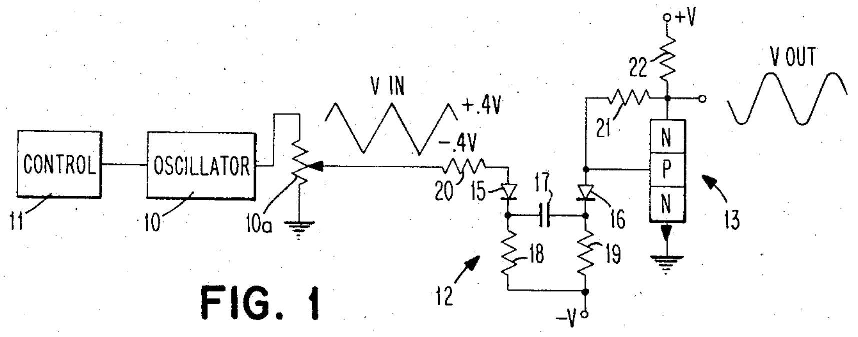
FIG. 1 is a circuit diagram, schematic in part and diagrammatic in part, of the improved sinusoidal waveform generating apparatus.

The improved apparatus of FIG. 1 includes an oscillator 10, a control circuit 11 for determining the momentary frequency of oscillation of the oscillator 10, a preferred form of the improved diode filter 12, and a linear amplifier 13.

The oscillator 10 may be one of several types well-known in the art which produce triangular output signals, i.e. the positive and negative slopes are equal. One example of such an oscillator is that shown and described at pages 366 and 367 of "Theory and Applications of Electron Tubes," Second edition, by Herbert J. Reich, published by McGraw-Hill Book Company—1944. The output frequency is changed by varying the value of the charge capacitor of the oscillator. The control circuit 11 is therefore utilized to vary the value of the capacitor in known manner. Since the oscillator output voltages are relatively high, they may be reduced to the desired values for application to the filter of FIG. 1 by means of a suitable voltage divider 10*a*.

The filter 12 includes a pair of diodes 15 and 16 with their cathodes connected to opposite plates of a low impedance capacitor 17. The cathodes are also connected to a negative bias potential by means of resistors 18 and 19 which act as constant current bias sources for the diodes. The anode of the diode 15 is coupled to the output of the oscillator 10 by means of a resistor 20. The anode of the diode 16 is connected to the base electrode of the transistor amplifier 13.

The amplifier 13 is a linear amplifier with a shunt feedback resistor 21 coupled between its base and collector electrodes and is characterized by a low input impedance. The collector of the amplifier 13 is connected to a source of operating potential by way of a resistor 22.

Figure 2:
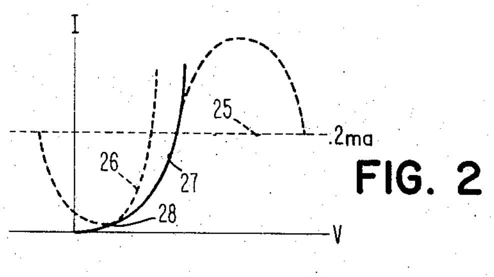
FIG. 2 shows a portion of the voltage-current characteristic of a solid state diode and desired operating characteristics of the circuits of FIG. 1.

The resistors 18 and 19 and the bias potential to which they are connected provide the desired D.C. bias current (e.g. 2 ma.) in the diodes 15 and 16 indicated by the level 25 in FIG. 2. The exponential diode characteristic is illustrated at 26. The resistor 20 (of proper value) helps to shape the diode characteristics more closely to that of a sine wave as illustrated at 27. Preferably, the input signals drive the diodes only to about point 28 on the characteristic curve 27 rather than to the zero voltage, current point to improve the output signal.

The capacitor 17 is of a sufficiently large value to provide a very low A.C. impedance (essentially a short circuit) between the diodes at the frequency of the input signals and additionally, serves the purpose of providing D.C. isolation between the diodes. As a result, the A.C. impedance seen by the triangular input voltage is essentially that of the two forward-biased diodes and the resistor 20 connected in series, whereby the input current will be a function of this impedance.

The operation of the improved filter will now be described in detail. When the input to the resistor 20 is at ground potential, the current through each of the diodes 15 and 16 is that indicated by line 25 of FIG. 2. As the input voltage rises positively from ground to its peak positive potential, (e.g.+.4 v.), the impedance of the diode 15 decreases exponentially as it enters its low impedance region; and the impedance of the diode 16 begins to increase to cause the current therethrough to decrease sinusoidally to the point 28, FIG. 2. The current from the constant current source resistor 19 is diverted from the diode 16 to the diode 15, whereby the input current increases, shown in FIG. 3.

As the input voltage returns to ground, the input and output currents return to the D.C. bias level.

Figure 3:
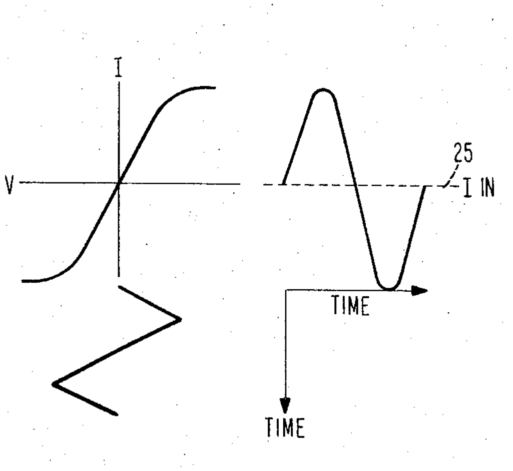
FIG. 3 shows the input voltage-current-time characteristics of the improved apparatus of FIG. 1.

When the input waveform applied to the resistor 20 varies toward its negative peak (e.g.—.4 v.) and back to ground potential, the impedance of the diode 16 decreases then increases exponentially while the impedance of the diode 15 increases then decreases exponentially to cause the input current to the filter to vary in the manner shown in FIG. 3 by diversion of current in the constant current source resistor 18 from the diode 15 to the diode 16.

Figure 4:
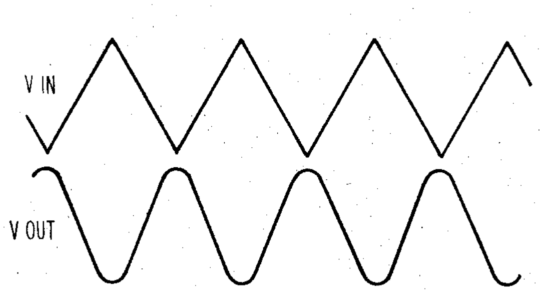
FIG. 4 shows the input, output waveforms obtained from the apparatus of FIG. 1.

The transistor amplifier 13 is operated as a low impedance linear current amplifier so that as the current through the filter diode 16 increases and decreases with a sinusoidal characteristic, the output voltage of the amplifier 13 will vary with a sinusoidal characteristic. Since the amplifier 13 is an inverter, its output voltage is 180° out of phase with respect to the input voltage as shown in FIG. 4.

It will be appreciated that the polarities of the diodes, the bias sources and the transistor may be changed in the usual manner by those skilled in the art without departing from the teachings of the invention.

Reliable operation of the circuit of FIG. 1 at one and two kilocycles was achieved with the following component values; however, the invention is to to be limited to such values which are given merely by way of example.

| | | |
|---|---|---|
| Resistors: | | |
| 18 | Ohms | 60,000 |
| 19 | do | 60,000 |
| 20 | do | 1,000 |
| 21 | do | 3,600 |
| 22 | do | 2,700 |
| Capacitor: | | |
| 17 | microfarads | 6.8 |

Supply voltages: +12 volts, —12 volts.

It will be appreciated that devices other than the preferred diode, having the same voltage-current characteristics as a diode, for example the base-emitter junction of a transistor, may be substituted for the diodes.

Other embodiments of the improved filter are shown in FIGS. 5–8; and, where components in these embodiments correspond functionally to components of FIG. 1, the same reference numerals are used. Each of these filter embodiments is suitable for use with the oscillator and control circuit of FIG. 1; however, the embodiments of FIGS. 1 and 5 exhibit the best temperature stability and need not be operated at the zero voltage-current level at which diode characteristics are not as uniform.

Figure 5:
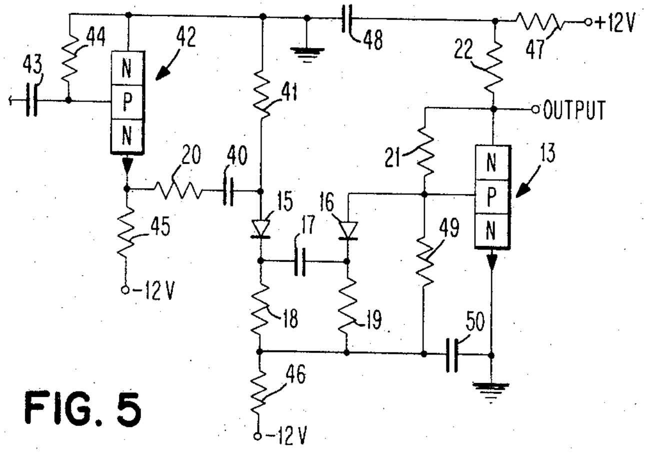
FIGS. 5–8 illustrate other forms which the diode filter of the improved apparatus of the present invention can take.

In FIG. 5, the diodes 15 and 16 and the capacitor 17 are connected in series to the base electrode of the linear amplifier 13. However, the resistor 20 is connected to the diode 15 by way of a coupling capacitor 40; and a D.C. bias resistor 41 is connected between the diode 15 and ground potential. The constant current source resistors 18 and 19 are connected to the negative bias potential by a resistor 46. The resistor 22 is connected to the positive bias potential by way of a resistor 47 and to ground potential by way of a capacitor 48. A resistor 49 shunts the diode 16 and the resistor 19; and a capacitor 50 connects the junction of resistors 19 and 49 to ground potential.

The input signal to the resistor 20 is derived from the emitter electrode of a common collector amplifier 42. The D.C. level of the emitter electrode is set at a desired value, e.g. —3 v., by resistors 44 and 45.

Triangular input signals applied to the base electrode of the amplifier 42 by way of a coupling capacitor 43 produce at the emitter electrode an A.C. triangular signal similar in form and amplitude variation to the input signal of FIG. 1.

Suitable values for the components of FIG. 5 are as follows.

| Resistors: | Values (ohms) |
|---|---|
| 18 | 42,200 |
| 19 | 56,200 |
| 20 | 910 |
| 21 | 3,600 |
| 22 | 2,700 |
| 41 | 10,000 |
| 44 | 300,000 |
| 45 | 16,000 |
| 46 | 1,500 |
| 47 | 1,000 |
| 49 | 56,000 |

| Capacitors: | Values (microfarads) |
|---|---|
| 17 | 6.8 |
| 40 | 6.8 |
| 43 | 1 |
| 48 | 6.8 |
| 50 | 6.8 |

Figure 6:
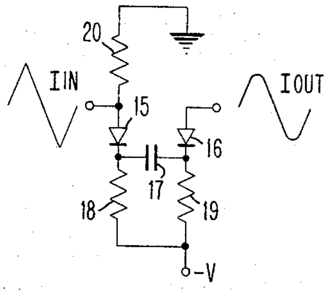

FIG. 6 is a modification of the embodiment of FIG. 1, wherein the resistor 20 is connected directly between the diode 15 and ground potential and wherein the input signal is in the form of a triangular current signal varying between +.4 milliampere and —.4 milliampere. The output signal at the anode of the diode 16 now appears as a sinusoidal current. The values of the components in FIG. 6 can be the same as those of the corresponding components in FIG. 1.

Figure 7:
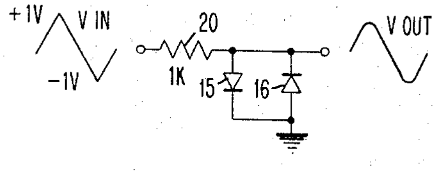
Figure 8:
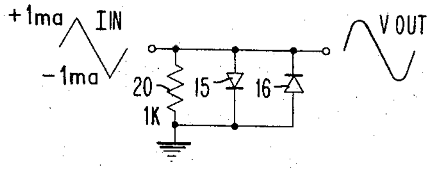

FIGS. 7 and 8 show embodiments in which the diodes 15 and 16 are connected in parallel instead of in series, but they are still poled oppositely. In each embodiment, the output signal is in the form of a generally sinusoidal voltage waveform.

Figure 9:
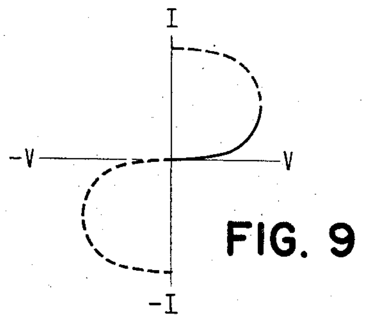
FIG. 9 is a voltage-current curve for the embodiments of FIGS. 7 and 8.

However, in FIG. 7, the input signal is a voltage waveform applied to a series resistor 20; whereas the equivalent circuit of FIG. 8 is characterized by a current input signal applied directly to the diodes with the resistor 20 connected in parallel therewith. FIG. 9 illustrates the V–I characteristic curve for the embodiments of FIGS. 7 and 8, whereas for the embodiment of FIG. 6, the curve would be shifted entirely into the forward bias voltage region.

Throughout the explanation thus far, the examples have illustrated the operation of the diodes at low current levels, e.g. not substantially greater than a few milliamperes.

However, many commercially available diodes have consistent, reliable voltage-current characteristics which are exponential at higher current levels. In fact, the typical voltage-current characteristic of a diode is exponential to the relatively high current levels at which the resistances of the P region and the N region become a significant factor. Frequently, this is not appreciated because the scale at which the characteristic is represented (e.g. curve 26, FIG. 2) is misleading.

Therefore, it will be appreciated that the diode filters of the present invention are operable at higher current levels. As the bias level 25 (FIG. 2) is raised, the value of the resistor 20 (FIG. 1) is preferably decreased proportionately to obtain the same percent change in current through the diodes in response to the same input signal levels. For example, if the bias level 25 of the diodes of FIG. 1 is raised to 1 ampere, the resistor 20 should be reduced to approximately two-tenths ohm for optimum operation, with the input signal varying from +.4 v. to −.4 v.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A frequency insensitive filter for a source of electrical signals which signals are characterized by the amplitude of one of the variables of the voltage-current characteristic varying linearly with time with a predetermined peak-to-peak amplitude, comprising a pair of oppositely poled diodes, means connecting the source to the diodes, and means biasing the diodes to a selected operating level which causes only an exponential change in impedance in one of the diodes as the signals change from their reference level to one of the peak levels and back to the reference level and only an exponential change in impedance in the other diode as the signals change from the reference level to the other peak level and back to the reference level to produce generally sinusoidal output signals in response to and at the same frequency as said electrical signals.

2. The filter of claim 1, wherein said means includes a resistor of selected impedance value connected to the diodes and to the source to cause the output signals to more closely correspond to a sinusoidal waveform.

3. A filter producing substantially sine wave output signals in response to a source of symmetrical triangular input voltage signals having a selected peak-to-peak amplitude comprising a first diode having a pair of electrodes one of which is connected to the source of input signals;

a low impedance capacitor having a pair of terminals one of which is connected to the other electrode;

a second diode having a pair of electrodes, the one electrode of the second diode which is of the same conductivity type as that of said other electrode of the first diode being connected to the other terminal of the capacitor; and constant current means forward biasing the diodes in a portion of their voltage-current characteristic which resembles 90° of a sinusoidal waveform.

4. The filter of claim 3, further comprising a linear amplifier having a low input impedance coupled to the other electrode of the second diode for producing a generally sinusoidal output voltage.

5. A filter producing substantially sinusoidal output signals in response to a source of symmetrical triangular input voltage signals having a peak-to-peak amplitude in the order of eight-tenths of a volt, said filter comprising a first diode having a pair of electrodes;

means including a resistor of selected value connecting one electrode to the source of input signals;

means including a constant current source connected to the other electrode, forward biasing the diode at approximately two-tenths milliampere, a low impedance capacitor having a pair of terminals one of which is connected to said other electrode;

a second diode having a pair of electrodes, the one electrode of the second diode which is of the same conductivity type as that of said other electrode of the first diode being connected to the other terminal of the capacitor; and means including a second constant current source connected to said one electrode of the second diode, forward biasing the second diode at approximately two-tenths milliampere.

6. A signal producing circuit comprising a series-connected circuit including a pair of oppositely poled diodes and a low impedance capacitor interposed between the diodes;

a pair of constant current sources each forward biasing a respective diode at a point with a portion of its voltage-current characteristic which resembles 90° of a sinusoidal waveform; and a source of variable amplitude signals applied to one end of the series circuit varying the impedances of the diodes at a generally sinusoidal rate to divert the current of one constant current source then the other at a generally sinusoidal rate from said one diode to the other diode and then from the other diode to the one diode producing a susbstantially sinusoidal output current at the other end of the series circuit.

7. The circuit of claim 6, further comprising a resistor of selected value connected in series with the diodes and capacitor causing the output current to more closely correspond to a sinusoidal waveform.

8. The circuit of claim 6, further comprising a linear amplifier having a low input impedance coupled to the other end of the series circuit for producing a generally sinusoidal output voltage.

9. A signal producing circuit comprising a series-connected circuit including a pair of oppositely poled diodes and a low impedance capacitor interposed between the diodes;

a pair of constant current sources, each forward biasing a respective diode near the entry point to its low impedance region; and a source of variable voltage signals applied to one end of the series circuit varying the impedance of one diode and then the other at a generally sinusoidal rate from said entry point to a relative high impedance region and back to the entry point to divert the current of one constant current source then the other at a generally sinusoidal rate from said one diode to the other diode and then from the other diode to the one diode producing a substantially sinusoidal output current at the other end of the series circuit.

10. The circuit of claim 9, together with a resistor of selected value connected in series with the diodes and capacitor causing the output current to more closely correspond to a sinusoidal waveform.

11. A filter comprising a series-connected circuit including a pair of oppositely poled diodes and a low impedance capacitor interposed between the diodes;

constant current means forward biasing each diode near the entry point to its low impedance region; and a source of symmetrical triangular voltage signals referenced about ground potential and applied to one end of the series circuit varying the impedance of one diode and then the other at a generally sinusoidal rate from said entry point to a relatively high impedance region and back to the entry point to divert the current of one constant means then the other at a generally sinusoidal rate from said one diode to the other diode and then from the other diode to the one diode producing a substantially sine wave output current at the other end of the series circuit.

12. Frequency shift keying apparatus comprising an oscillator selectively operated at either of at least two frequencies to produce output signals the amplitude of which vary linearly as a function of time;

a series-connected circuit including a pair of oppositely poled diodes and a low impedance capacitor interposed between the diodes;

a pair of constant current means, each forward biasing a respective diode at a point within a portion of its voltage-current characteristic which resembles 90° of a sinusoidal waveform; and means applying the oscillator output signals to one end of the series circuit at a predetermined peak-to-peak amplitude for producing a substantially sine wave output current at the other end of the series circuit.

13. Frequency shift keying apparatus comprising an oscillator producing generally triangular output signals at either one of two frequencies;

control means selective operating the oscillator at the desired frequencies;

a series-connected circuit including a pair of oppositely poled diodes and a low impedance capacitor interposed between the diodes;

constant current means individually forward biasing each diode near the entry point to its low impedance region; and means applying the triangular signals to one end of the series circuit at a predetermined peak-to-peak amplitude for varying the impedance of one diode and then the other at a generally sinusoidal rate from said entry point to a relatively high impedance region and back to the entry point to divert the current of one constant current means then the other at a generally sinusoidal rate from said one diode to the other diode and then from the other diode to the one diode producing a substantially sine wave output current at the other end of the series circuit.

14. Apparatus for producing substantially sinusoidal output signals and for readily changing the frequency of the output signals from one to another of a plurality of selected frequencies comprising means for producing signals characterized by the amplitude of one of the variables of the voltage-current characteristic varying substantially linearly with time;

control means selectively operating the signal producing means at desired frequencies;

a series circuit having end terminals and including a pair of oppositely poled diodes and a low impedance capacitor interposed between the diodes;

means forward biasing each diode to a desired operating level; and means coupling one end terminal to the signal producing means to produce generally sinusoidal output signals at the other end terminal.

15. Apparatus for producing substantially sinusoidal output signals and for readily changing the frequency of the output signals from one to another of a plurality of selected frequencies comprising means for producing signals characterized by the amplitude of one of the variables of the voltage-current characteristic varying substantially linearly with time, control means selectively operating the signal producing means at desired frequencies, a series circuit having end terminals and including a pair of oppositely poled diodes and a low impedance capacitor interposed between the diodes, means forward biasing each diode to a desired operating level, means including a resistor of selected value coupling one end terminal to the signal producing means to produce generally sinusoidal output signals at the other end terminal, and a low impedance linear transistor amplifier connected to the other end terminal to produce general sinusoidal output signals.

16. Apparatus for producing substantially sinusoidal output signals and for readily changing the frequency of the output signals from one to another of a plurality of selected frequencies comprising means for producing first signals characterized by the amplitude of one of the variables of the voltage-current characteristic varying substantially linearly with time with a predetermined peak-to-peak amplitude, control means selectively operating the signal producing means at the desired frequencies, and means including a pair of oppositely poled diodes one of which exhibits only an exponential change in impedance as the first signals change from their reference level to one of the peak levels and back to the reference level and the other of which exhibits only an exponential change in impedance as the first signals change from their reference level to the other peak level and back to the reference level for producing generally sinuosoidal output signals of the same frequency as the first signal.

17. Apparatus for producing substantially sinusoidal output signals and for readily changing the frequency of the output signals from one to another of a plurality of selected frequencies comprising means for producing first signals characterized by the amplitude of one of the variables of the voltage-current characteristic varying substantially linearly with time with a predetermined peak-to-peak amplitude, control means selectively operating the signal producing means at the desired frequencies, and means including a pair of oppositely poled diodes, each biased to a selected operating level, one of the diodes exhibiting only an exponential change in impedance as the first signals change from their reference level to one of the peak levels and back to the reference level and the other diode exhibiting only an exponential change in impedance as the first signals change from their reference level to the other peak level and back to the reference level for producing generally sinusoidal output signals of the same frequency.

18. The apparatus of claim 17, together with a resistor of selected impedance value connected between the diodes and the signal producing means to cause the output signals to more closely correspond to a sinusoidal waveform.

19. The combination comprising a source of cyclical input signals which is characterized by the amplitude of one of the variables of the voltage-current characteristic varying substantially linearly with time with a predetermined peak-to-peak amplitude, and means including a pair of oppositely poled diodes, one of which exhibits only an exponential change in impedance as the input signal changes from its reference level to one of the peak levels and back to the reference level and the other of which exhibits only an exponential change in impedance as the input signal changes from its reference level to the other peak level and back to the reference level for producing generally sinusoidal output signals of the same frequency.

20. The filter of claim 19, wherein said means includes a resistor of selected impedance value connected to the diodes to cause the output signals to more closely correspond to a sinusoidal waveform.

21. The combination comprising a source of cyclical input signals which is characterized by the amplitude of one of the variables of the voltage-current characteristic varying substantially linearly with time with a predetermined peak-to-peak amplitude, and means including a pair of series-connected, oppositely poled diodes forward biased to a selected operating level, one of which exhibits only an exponential change in impedance as the input signal changes from its reference level to one of the peak levels and back to the reference level and the other of which exhibits only an exponential change in impedance as the input signal changes from its reference level to the other peak level and back to the reference level for producing generally sinusoidal output signals of the same frequency.

22. The filter of claim 21, wherein said means includes a resistor of selected impedance value coupling the input signals to the diodes to cause the output signals to more closely correspond to a sinusoidal waveform.

23. The combination comprising a source of cyclical input signals which is characterized by the amplitude of one of the variables of the voltage-current characteristic varying substantially linearly with time with a predetermined peak-to-peak amplitude, and means exhibiting only an exponential change in impedance as the input signal changes from its reference level to one of the peak levels and back to the reference level and exhibiting only an exponential change in impedance as the input signal changes from its reference level to the other peak level and back to its reference level for producing generally sinusoidal output signals of the same frequency.

References Cited

UNITED STATES PATENTS

| | | | |
|---|---|---|---|
| 2,576,026 | 11/1951 | Meacham | 307—88.5 X |
| 2,775,714 | 12/1956 | Curtis | 307—88.5 |

FOREIGN PATENTS

| | | |
|---|---|---|
| 1,103,403 | 3/1961 | Germany. |

ARTHUR GAUSS, *Primary Examiner.*

JOHN A. JORDAN, *Assistant Examiner.*